(12) United States Patent
Iwasawa

(10) Patent No.: US 9,182,489 B2
(45) Date of Patent: Nov. 10, 2015

(54) LASER SCAN SENSOR

(71) Applicant: OPTEX Co., Ltd., Shiga (KE)

(72) Inventor: Masashi Iwasawa, Shiga (JP)

(73) Assignee: OPTEX CO., LTD., Shiga (JP)

( * ) Notice: Subject to any disclaimer, the term of this patent is extended or adjusted under 35 U.S.C. 154(b) by 0 days.

(21) Appl. No.: 14/129,654

(22) PCT Filed: Nov. 2, 2012

(86) PCT No.: PCT/JP2012/078503
§ 371 (c)(1),
(2) Date: Dec. 27, 2013

(87) PCT Pub. No.: WO2013/069575
PCT Pub. Date: May 16, 2013

(65) Prior Publication Data
US 2014/0204362 A1    Jul. 24, 2014

(30) Foreign Application Priority Data
Nov. 9, 2011    (JP) .................................. 2011-245868

(51) Int. Cl.
     *G01S 17/02*      (2006.01)
     *G01S 17/42*      (2006.01)
     (Continued)

(52) U.S. Cl.
CPC ............. *G01S 17/026* (2013.01); *G01S 7/4802* (2013.01); *G01S 7/497* (2013.01); *G01S 17/42* (2013.01); *G08B 13/187* (2013.01); *G01S 17/89* (2013.01)

(58) Field of Classification Search
CPC ............................ G01S 7/4802; G08B 13/184
USPC ........................................ 356/5.01
See application file for complete search history.

(56) References Cited

U.S. PATENT DOCUMENTS

| 7,940,178 | B2 | 5/2011 | Iwasawa |
| 2009/0091447 | A1 | 4/2009 | Iwasawa |

(Continued)

FOREIGN PATENT DOCUMENTS

| EP | 2 048 517 | 4/2009 |
| EP | 2 053 424 | 4/2009 |

(Continued)

OTHER PUBLICATIONS

International Search Report issued Dec. 25, 2012 in International (PCT) Application No. PCT/JP2012/078503.

*Primary Examiner* — Luke Ratcliffe
(74) *Attorney, Agent, or Firm* — Wenderoth, Lind & Ponack, L.L.P.

(57) ABSTRACT

The configuration includes a laser range finder (110), a scan mechanism (120), a distance-data acquiring unit (130), a memory (160), which stores installation state information and detection-area information for each measurement direction, a human-body determining unit (140), a detection area-information updater (140), which updates detection-area information under a predetermined condition, and the alert-output control unit (150). The human-body determining unit (140) extracts a portion that possibly corresponds to a human body in an object that has invaded or moved, which is found out by comparison with the detection-area information based on the acquired distance information, and determines whether or not a rest of the respective extracted portions is a human body based on a movement state of each of the extracted portion in chronological order. The rest of the extracted portions excludes the extracted portions where a movement distance within a predetermined time is within a predetermined distance.

8 Claims, 4 Drawing Sheets

(51) Int. Cl.
    *G01S 7/48*     (2006.01)
    *G08B 13/187*     (2006.01)
    *G01S 7/497*     (2006.01)
    *G01S 17/89*     (2006.01)

(56) References Cited

U.S. PATENT DOCUMENTS

2009/0108184 A1     4/2009    Iwasawa
2009/0109421 A1     4/2009    Iwasawa

FOREIGN PATENT DOCUMENTS

| | | | | |
|---|---|---|---|---|
| JP | 3011121 | 2/2000 | | |
| JP | 2004-185363 | 7/2004 | | |
| JP | 2009-093428 | 4/2009 | | |
| JP | 2009-110069 | 5/2009 | | |
| JP | 2009-110124 | 5/2009 | | |
| JP | 2010-102697 | 5/2010 | | |
| JP | 2011-215775 | 10/2011 | | |
| JP | 2011-215775 A | * 10/2011 | ............ | G08B 13/18 |

* cited by examiner

LASER SCAN SENSOR

TECHNICAL FIELD

The present invention relates to a laser scan sensor that detects, for example, an intruder into the building premises, and in particular, relates to a laser scan sensor that unerringly detects an intruder to be intrinsically detected even in the case where a harmless obstacle is additionally installed or an automobile or the like comes in and is parked within this surveillance area after a surveillance area is set, regardless of the presence of these objects.

BACKGROUND ART

Conventionally, a "security system" for detecting an intruder using a laser range finder that employs a laser beam as a light source has been proposed (for example, see Patent Literature 1).

This "security system" includes a sensor unit, a swivel camera unit, and a control unit. The sensor unit sets a monitoring area at a scan angle for two-dimensionally scanning a light of an optical range finder. When the sensor unit detects an intruder within the area, the sensor unit outputs distance data and angle data of the intruder. The swivel camera unit is installed on an electrically-operated swivel base, and turns in conjunction with the sensor unit. The control unit has a function of: detecting the presence of an intruder by continuously detecting change in the distance data or the angle data several times at the sensor unit; calculating the position of the intruder using the changed distance data and angle data from the sensor unit; turning the swivel camera unit on the electrically-operated swivel base in accordance with the positional data; and displaying image data of the intruder on a monitor.

An "object identifying method using an area sensor" has also been proposed (for example, see Patent Literature 2) although this method is slightly different from a crime prevention apparatus and a security system. This method can accurately identify a pedestrian or the like using a laser beam.

According to this "object identifying method using the area sensor", an area sensor using a laser detector scans while projecting a pulse laser beam within a detection range that covers a walking area to which the pedestrian is guided and a peripheral area of the walking area, so as to measure a reflection time of the light. This method obtains the difference between a reflection time when an object is not present and a reflection time when an object is present for each scanning point to perform calculation of the shape and the size of the object and the vector based on positional change of the object for each scanning. Based on this operation signal, the method identifies an object that moves in the walking area along a guiding direction and an object that moves in a direction across the walking area.

Furthermore, in view of problems in these conventional techniques, the inventors of this application have already proposed a laser area sensor that does not only facilitate setting an appropriate security zone for preventing false detection as much as possible corresponding to the actual installation site, the security purpose, or the like, but also facilitates setting any security zone (see Patent Literature 3).

This "laser area sensor" includes a laser range finder, a scanning mechanism unit, a distance-information acquiring unit, a human-body determining unit, and a human body-detection signal output unit. The laser range finder uses a time after a laser beam emits before a reflected light returns from an object present in a direction of the emission so as to measure the distance to the object. The scanning mechanism unit changes the measurement direction of this laser range finder. The distance-information acquiring unit periodically performs measurement using the laser range finder while changing the measurement direction using this scanning mechanism unit, so as to form a detection area and to acquire distance information for each direction within the detection area in chronological order. The human-body determining unit extracts a portion estimated to correspond to a human body from the distance information acquired by this distance-information acquiring unit, and then determines whether or not the object is a human body based on a movement state of the extracted portion in chronological order. The human body-detection signal output unit outputs a human body detection signal in the case where this human-body determining unit determines that a human body is present.

CITATION LIST

Patent Literature

Patent Literature 1: Japanese Patent No. 3011121
Patent Literature 2: Japanese Unexamined Patent Application Publication No. 2004-185363
Patent Literature 3: Japanese Unexamined Patent Application Publication No. 2009-093428

SUMMARY OF INVENTION

Technical Problem

For example, the conventional technique disclosed in Patent Literature 3 extracts the portion estimated to correspond to the human body based on the height, the width, or similar parameter of the detected object in the acquired distance information. Subsequently, the conventional technique makes determination to confirm whether or not the detected object is an actual human body based on the detection duration, the movement state, and similar parameter in chronological order regarding the extracted portion.

As a tracking response with respect to an object that has invaded the inside of the surveillance area, the configuration continuously provides detection output as long as this object is present within the surveillance area. Accordingly, for example, also in the case where only a harmless automobile or the like comes in and is parked in the surveillance area, the continuous detection output is provided. Thus, the invasion of an object other than this automobile or a human body might not be substantially detected. This has been a problem.

In the case where the surveillance area is changed by parking this harmless automobile or the like or by moving an installation object in association with renovation of building or similar event, a method for performing an area scan of a detecting object at regular time intervals or a method for performing a rescan by the start of surveillance due to an external trigger is possible.

However, for example, in the installation site where the state such as the position of the human body and the location of the object within the surveillance area is frequently changed like a high-traffic area, the rescan at regular time intervals is not so effective. In the case where surveillance is started by the external trigger, for example, such control by a trigger signal is necessary. There has also been a problem from the aspect of system operation.

The present invention has been made in view of the above-described problems of the conventional techniques, and it is an object of the present invention to provide a laser scan sensor that unerringly detects an intruder to be intrinsically detected even in the case where an automobile or the like comes in and is parked or a harmless obstacle is additionally installed within this surveillance area after a surveillance area is set, regardless of the presence of these objects.

Solutions to the Problems

In order to achieve the above object, a laser scan sensor of the present invention includes a laser range finder, a scanning mechanism unit, a distance-information acquiring unit, an installation-state storage unit, a detection area-information storage unit, a human-body determining unit, a detection area-information updater, and an alert-signal output unit. The laser range finder is configured to measure a distance to an object based on a time after a laser beam emits before a reflected light returns from the object present in a direction of the emission. The scanning mechanism unit is configured to change a measurement direction of the laser range finder. The distance-information acquiring unit is configured to periodically perform measurement using the laser range finder while changing a measurement direction using the scanning mechanism unit, so as to form a detection area and acquire distance information for each measurement direction within the detection area in chronological order. The installation-state storage unit is configured to store installation state information of the laser range finder. The detection area-information storage unit is configured to store distance information to be a reference for each measurement direction as detection-area information. The human-body determining unit is configured to extract a portion that possibly corresponds to a human body in an object that has invaded or moved. The object is found out by comparison with the detection-area information based on the distance information acquired by the distance-information acquiring unit. The human-body determining unit is configured to determine whether or not a rest of the respective extracted portions is a human body based on a movement state of each of the extracted portions in chronological order. The rest of the extracted portions excludes the extracted portions where a movement distance within a predetermined time is within a predetermined distance. The detection area-information updater is configured to update the detection-area information for each measurement direction under a predetermined condition. The alert-signal output unit is configured to output an alert signal in a case where a human body is determined to be present by the human-body determining unit.

Here, the installation state information is preferred to include at least an installation height and a measurement direction of the laser range finder. Additionally, the detection-area information may employ, for example, the distance information for each measurement direction immediately after operation start of the distance-information acquiring unit or after a lapse of a certain period of time after the operation start of the distance-information acquiring unit.

The laser scan sensor with this configuration can unerringly detect an intruder to be intrinsically detected even in the case where an automobile or the like comes in and is parked or a harmless obstacle is additionally installed within this surveillance area after a surveillance area is set, regardless of the presence of these objects.

In the laser scan sensor of the present invention, the detection area-information updater may gradually update the detection-area information of the measurement direction at a predetermined proportion in a case where a height calculated from the distance information for each measurement direction based on the installation state information is equal to or less than a predetermined height. Furthermore, the detection area-information updater may be configured to update the detection-area information by replacing the detection-area information of the measurement direction with a weighted average value (in which the distance information has a smaller weight) of the detection-area information and the distance information acquired by the distance-information acquiring unit.

The laser scan sensor with this configuration gradually updates the detection-area information, absolutely. This reduces the occurrence of malfunctions due to accidental factors such as instantaneous changes within the surveillance area and measurement errors of the laser range finder as much as possible.

The laser scan sensor of the present invention may further include a switching unit configured to switch between valid and invalid states of the detection area-information updater.

The laser scan sensor with this configuration can switch whether or not to update the detection-area information as necessary.

Advantageous Effects of Invention

The laser scan sensor of the present invention can accurately detect an intruder to be intrinsically detected even in the case where an automobile or the like comes in and is parked or a harmless obstacle is additionally installed within this surveillance area after a surveillance area is set, regardless of the presence of these objects.

DESCRIPTION OF EMBODIMENTS

Figure 1:
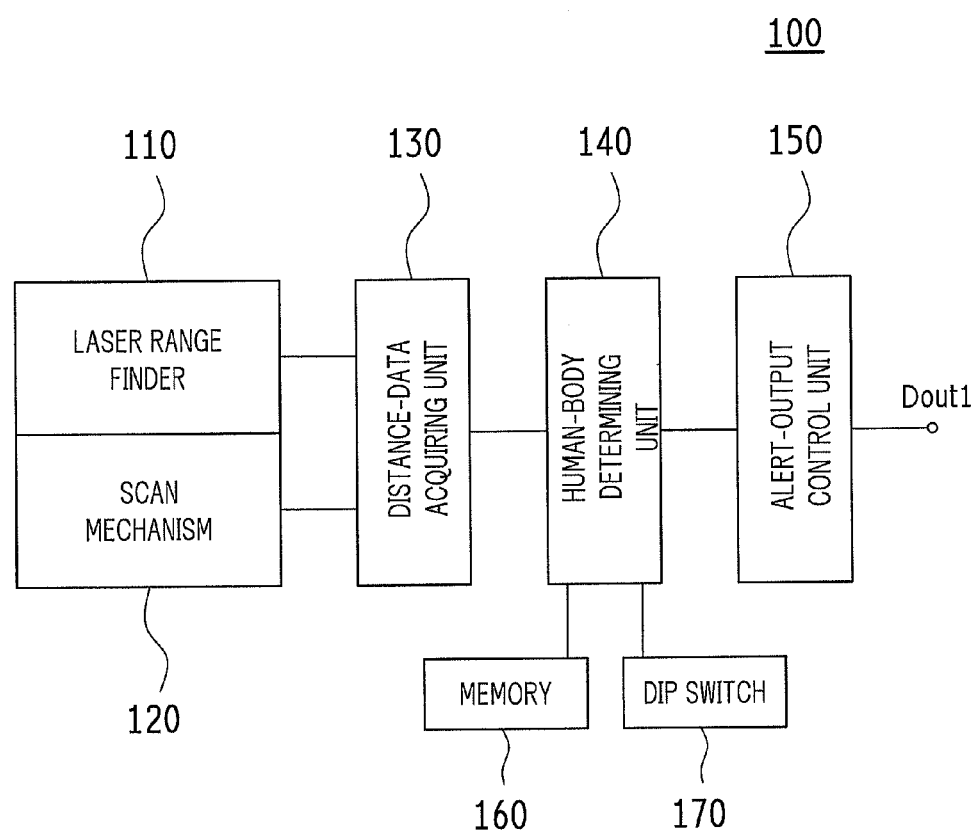
FIG. 1 is a block diagram illustrating a schematic configuration of a laser scan sensor 100 according to one embodiment of the present invention.

Hereinafter, a description will be given of an embodiment of the present invention by referring to the drawings.

<Schematic Configuration of Laser Scan Sensor 100>

FIG. 1 is a block diagram illustrating a schematic configuration of a laser scan sensor 100 according to one embodiment of the present invention.

Figure 2:
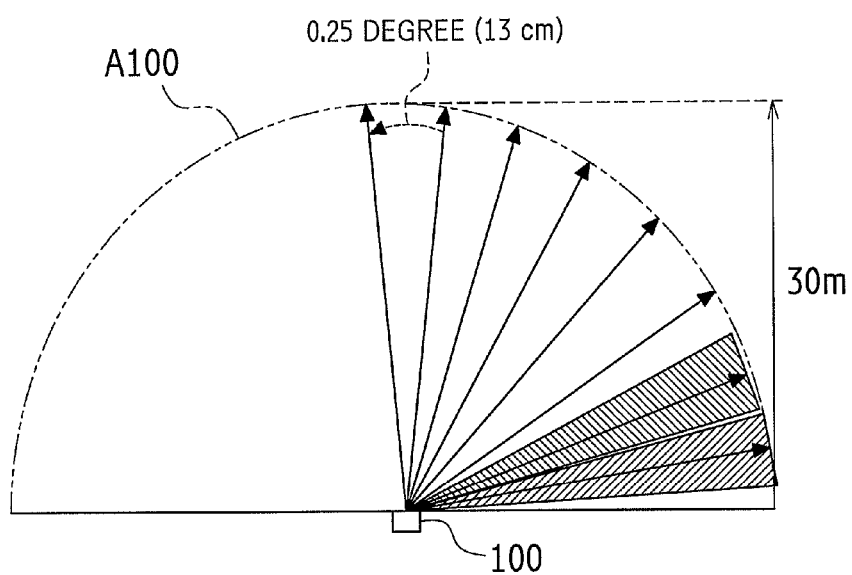
FIG. 2 is a schematic plan view illustrating a detection area formed by the laser scan sensor 100.
Figure 3:
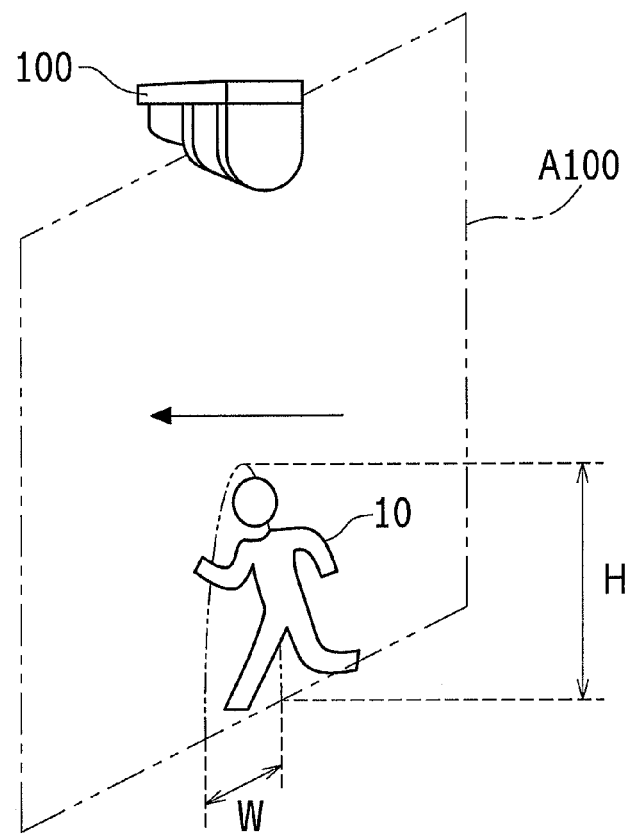
FIG. 3 is a schematic perspective view illustrating an example where a person 10 invades a site where the laser scan sensor 100 is downwardly installed above the ground.

FIG. 2 is a schematic plan view illustrating a detection area formed by this laser scan sensor 100. Here, in FIG. 2, intervals between adjacent distance measurement directions are illustrated much larger than actual intervals for convenience of explanation. FIG. 3 is a schematic perspective view illustrating an example where a person 10 invades a site where the laser scan sensor 100 is downwardly installed above the ground.

As illustrated in FIG. 1, the laser scan sensor 100 includes a laser range finder 110, a scan mechanism 120, a distance-data acquiring unit 130, a human-body determining unit 140, an alert-output control unit 150, a memory 160, and a DIP switch 170.

The laser range finder 110 emits a pulse laser beam and precisely measures an infinitesimal time until a reflected light returns from an object present in a direction of the emission, so as to accurately measure the distance to the object. In the laser range finder 110, a light emitting element of a laser beam can employ, for example, a semiconductor laser diode (LD). A light receiving element can employ, for example, an avalanche photodiode (APD). Disposing a dedicated hardware circuit or the like is preferred, for example, for controlling the drive of the light emitting element or for measuring the time before the reflected light returns. As a general feature, the laser range finder can measure a precise distance up to a considerably long distance. For example, the laser range finder can measure several tens of meters at maximum, in some cases, can measure even a much longer distance. However, the laser range finder 110 employs 30 m as the maximum detection distance.

The scan mechanism 120 incorporates, for example, a motor (not illustrated) so as to rotate itself, and is mechanically coupled to at least a part of the laser range finder 110 so as to change the measurement direction (angle) of the distance by the laser range finder 110. For example, a configuration that rotates only the section of the optical system in the laser range finder 110 is possible. However, a configuration that rotates the whole laser range finder 110 and other configurations are also possible. The scan mechanism 120 rotates at a constant speed along a predetermined direction, and the measurement direction of the distance by the laser range finder 110 changes in conjunction with this rotation.

While the scan mechanism 120 changes the measurement direction, the laser range finder 110 periodically repeats the measurement. Accordingly, the distance-data acquiring unit 130 forms a detection area A100 as illustrated in FIG. 2, and acquires distance data in each measurement direction (also referred to as "step") at a predetermined angular interval within the detection area A100 per predetermined time in chronological order. Here, for example, distance data obtained immediately after the operation start of the distance-data acquiring unit 130 or after a lapse of a certain period of time for each measurement direction is stored in the memory 160 as reference distance data.

For example, assume that a scanning period T of the scan mechanism 120 is 50 ms (in which scanning is performed 20 times per 1 second) and a pulse laser beam is emitted in a range of 180 degrees corresponding to a half of one rotation to measure the distance. In the case where the pulse width of the pulse laser beam is 34 ns and the light-emitting period is 34.7 μs, the distance measurement can be performed 720 times within the range of 180 degrees. In this case, the angular interval of the distance measurement is 0.25 degree that is only about 13 cm as illustrated in FIG. 2 even 30 m away. Therefore, the spatial resolution within the detection area A100 is considerably high. This allows considerably accurately identifying the position, the size (width), the shape, and similar parameter of the detected object based on the distance data acquired by the distance-data acquiring unit 130, and determines, for example, whether or not the detected object is a human body. Even in the case where a plurality of human bodies is present within the detection area A100, this can individually identifies these human bodies. This distance data can be obtained for each 50 ms of the scanning period T. The numerical values described here are merely examples.

In FIG. 2, the description has been given of the case where the laser range finder 110 is installed in the horizontal direction and the laser range finder 110 periodically repeats the measurement while the scan mechanism 120 changes the measurement direction parallel to the ground. The installation state is not limited to this. For example, as illustrated in FIG. 3, the laser range finder 110 may be installed vertically downward or obliquely downward in a position at a certain height from the ground. In this case, simply storing information of this installation state, specifically, an installation height, a measurement direction, and similar information in the memory 160 allows calculating the height of the object by referring to these pieces of information.

The human-body determining unit 140 firstly analyzes the distance data acquired by the distance-data acquiring unit 130. Comparing the distance data for each measurement direction with the corresponding reference distance data stored in the memory 160 finds out the possibility that some object invades or an already-present object has moved in the measurement direction where the distance data changed. Subsequently, the acquired distance data is converted into a two-dimensional plane based on each measurement direction of the distance data so as to extract a portion estimated to correspond to a human body shape from the shape, the range, and similar parameter of the object that has invaded or moved.

For example, as illustrated in FIG. 3, in the case where the human body 10 faces a direction to the laser scan sensor 100 side, a width W of the trunk part is about several tens of cm. Therefore, assuming that the width W is 40 cm, the width W corresponds to about three pieces of contiguous data at the distance of 30 m. When the distance becomes shorter, the width between the contiguous data becomes narrow correspondingly. For example, at a distance of 20 m, the width becomes about 8.8 cm. At a distance of 10 m, the width becomes about 4.4 cm. At this time, the number of portions of the contiguous data increases conversely regarding the same actual width. For example, at a distance of 10 m, a width of 40 cm corresponds to about nine pieces of the contiguous data. In the case where the human body does not face the direction to the laser scan sensor 100 side but faces obliquely or sideways, of course, the width appearing in the distance data becomes narrow.

Except a small child, the human body 10 is considered to have a height H that is ordinarily equal to or more than 1 m. In the case where the height of the detected object is lower than this height, there is a high possibility that a small animal that accidentally wanders into the area or the like is detected. On the other hand, assuming that general vehicle and the like are covered, the height of the detected object is considered to be ordinarily less than 2 m.

The distance data is acquired in chronological order by the distance-data acquiring unit 130. Therefore, subsequently, the human-body determining unit 140 obtains a movement state of the extracted portion that is estimated to have a high possibility of the human body in the distance data so as to recognize how this portion changes in the subsequent distance data. For example, in the case where the trajectory of the movement is significantly discontinuous, it is determined that there is a high possibility that the detected object is not a human body. On the other hand, in the case where the detected object is completely motionless or the movement distance is only a little, it is determined that the detected object is not at least an intruder to be watched out. Furthermore, taking into consideration the moving direction and similar parameter allows more accurately distinguishing, for example, between an intruder to watch out for and just a passerby walking near the border of the detection area A100. Putting the above-described distinguished result and similar condition together, it is determined whether or not a human body to be watched out is present.

Even if an object is detected at a distance equal to or more than 30 m, the position of the object corresponds to the outside of the detection area A100. Therefore, this object is not treated as a target for determining whether or not the target is a human body as described above. This, however, should not be construed in a limiting sense.

A detection-area update switch is disposed as one switch included in a plurality of switches of the DIP switch 170. The detection-area update switch is for switching whether or not to automatically update distance data under a predetermined condition, which is described later, among the stored distance data for respective measurement directions of the laser scan sensor 100 in the memory 160 as the reference distance data, by external manual operation as necessary.

The alert-output control unit 150 outputs an alert signal Dout1 in the case where the human-body determining unit 140 determines that a human body is present.

The distance-data acquiring unit 130, the human-body determining unit 140, the alert-output control unit 150, the memory 160, and the like are preferred to be configured by, for example, a one-chip microcomputer to be embedded in a device and software processing of this one-chip microcomputer. Each determination process described above and similar process can be realized by a method such as pattern matching. Therefore, a comparatively low-cost one-chip microcomputer can be employed. This contributes to cost reduction in overall laser scan sensor 100. However, the one-chip microcomputer is not necessarily used.

<Update Process on Reference Distance Data for Each Measurement Direction>

Figure 4:
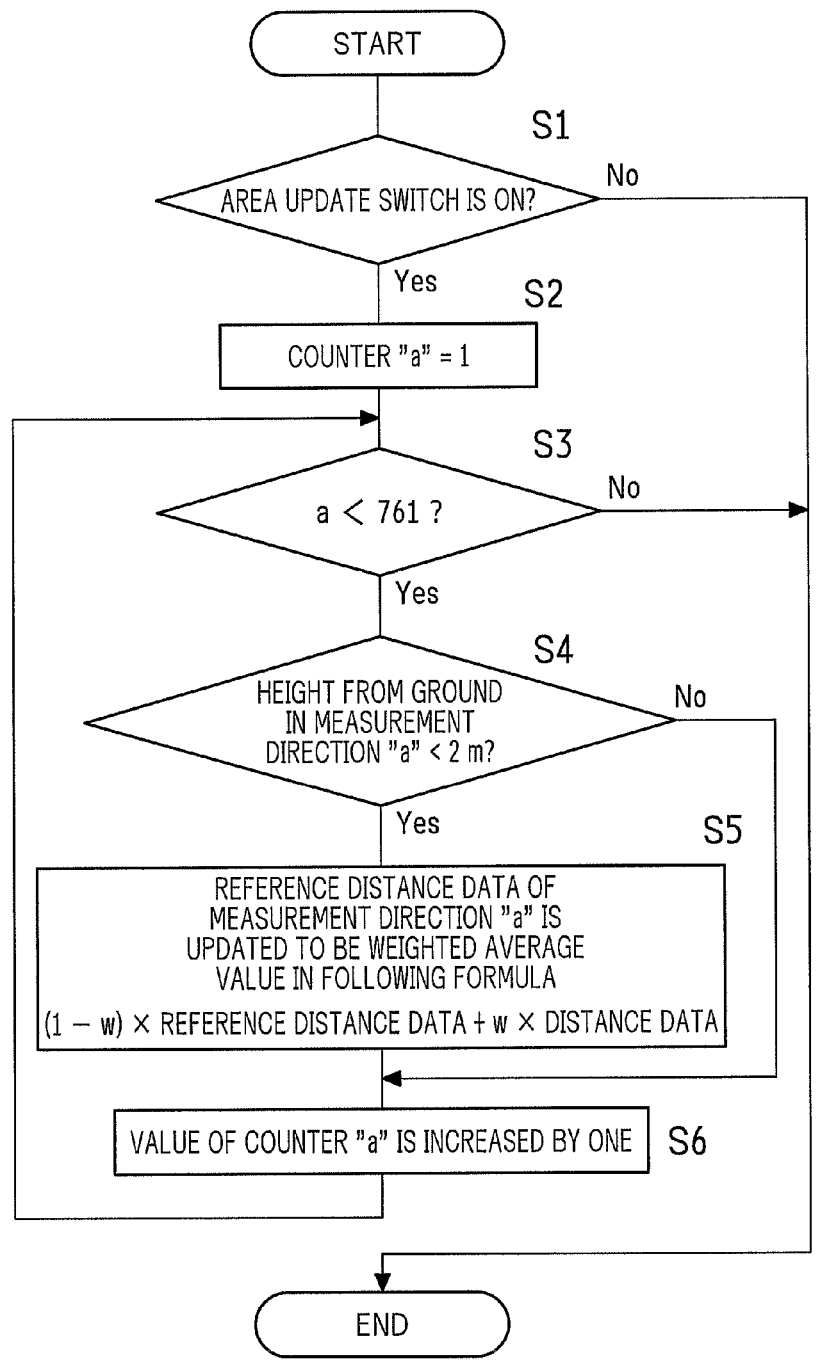
FIG. 4 is a schematic flowchart illustrating an outline of an update process on a reference distance data for each measurement direction of the laser scan sensor 100.

FIG. 4 is a schematic flowchart illustrating an update process on the reference distance data for each measurement direction of the laser scan sensor 100. As can be seen from the schematic configuration of the laser scan sensor 100 illustrated in FIG. 1, this update process is assumed to be performed by the human-body determining unit 140. Separately from the human-body determining unit 140, a unit for performing this update process or the like may be disposed.

Firstly, it is determined whether or not the state of the detection-area update switch is ON (in step S1). In the case where a determination of NO is made, the update process is terminated without performing any process.

In the case where a determination of YES is made, a counter "a" is initialized to be one (in step S2). The counter "a" is used for loop control that repeats the process on all the measurement directions and corresponds to the measurement direction of the laser scan sensor 100.

At the beginning of the loop control, it is determined whether or not the counter "a" is less than 761 (in step S3). In the case where a determination of NO is made (that is, a=761), the process on all the measurement direction has already been completed. Accordingly, the update process is terminated.

In the case where a determination of YES is made (that is, 1≤a≤760), it is determined whether or not a calculated height of the object from the ground is less than 2 m (in step S4). This height is calculated from the distance data (described as distance data [a]) in the measurement direction corresponding to the counter "a". In the case where a determination of NO is made, the process proceeds directly to step S6. Here, the threshold value (2 m) used for the distinction in step S4 corresponds to a threshold value of the height that covers general vehicles and the like. The threshold value does not need to be accurately 2 m. For example, this threshold value is set variable. The threshold value may be preliminarily set to an appropriate value or may be changed by external operation or similar method depending on the installation site or the object assumed to invade this installation site (whether or not, for example, the object is only a person or can be a vehicle).

In the case where a determination of YES is made, in the corresponding reference distance data stored in the memory 160, only the reference distance data (described as reference distance data [a]) of the measurement direction corresponding to the counter "a" is updated to be the weighted average value according to the following formula (in step S5). The process proceeds to step S6.

$$(1-w) \times \text{reference distance data } [a] + w \times \text{distance data } [a]$$

Here the value of "w" employs, for example, $1/128$, but is not limited to this value.

In any case of the conditional branches in step S4, the value of the counter "a" is increased by one (in step S6). Subsequently, the process returns to step S3 and the process up to step S6 is repeated.

With the above-described configuration of the first embodiment, even in the case where an automobile or the like come in and is parked or in the case where a harmless obstacle is additionally installed within the surveillance area, after the laser scan sensor 100 starts the surveillance operation and sets the surveillance area, only reference distance data in a corresponding measurement direction in the reference distance data stored in the memory 160 is gradually updated at a predetermined proportion. This measurement direction corresponds to the object that is not an intruder as an intrinsically detecting object. This allows always unerringly detecting the intruder corresponding to the latest state change within the surveillance area.

For example, even in the case where the installation posture of the laser scan sensor 100 is slightly changed by an external impact or similar force and then a surveillance area to be formed is changed, the surveillance area is automatically remedied. This reduces false detection or false alarm as much as possible.

Here, in combination with the above-described update process, for example, all of or a part of the reference distance data stored in the memory 160 may further be updated with the distance data acquired by the distance-data acquiring unit 130 at that point each time a certain period of time has elapsed after the start of the surveillance operation of the laser scan sensor 100, by external trigger signal control, or by similar method, similarly to the conventional technique.

The present invention may be embodied in various other forms without departing from the gist or essential characteristics thereof. Therefore, the embodiments disclosed in this application are to be considered in all respects as illustrative and not limiting. The scope of the invention is indicated by the appended claims rather than by the foregoing description. All modifications or changes that come within the meaning and range of equivalency of the claims are intended to be embraced therein.

This application claims priority on Japanese Patent Application No. 2011-245868 filed in Japan on Nov. 9, 2011, the entire content of which is incorporated herein by reference. Moreover, all documents cited in this specification are herein incorporated by reference.

DESCRIPTION OF REFERENCE SIGNS 10 human body, person
100 laser scan sensor
A100 detection area
110 laser range finder
120 scan mechanism
130 distance-data acquiring unit
140 human-body determining unit
150 alert-output control unit
160 memory
170 DIP switch

The invention claimed is:

1. A laser scan sensor, comprising:
a laser range finder configured to measure a distance to an object based on a time after a laser beam emits before a reflected light returns from the object present in a direction of the emission;
a scanning mechanism unit configured to change a measurement direction of the laser range finder;
a distance-information acquiring unit configured to periodically perform measurement using the laser range finder while changing the measurement direction using the scanning mechanism unit, so as to form a detection area and acquire distance information for each measurement direction within the detection area in chronological order;
an installation-state storage unit configured to store installation state information of the laser range finder;
a detection area-information storage unit configured to store distance information to be a reference for each measurement direction as detection-area information;
a human-body determining unit configured to:
extract a portion that possibly corresponds to a human body in an object that has invaded or moved, the object being found out by comparison with the detection-area information based on the distance information acquired by the distance-information acquiring unit; and
determine whether or not a rest of respective extracted portions is a human body based on a movement state of each of the extracted portions in chronological order, the rest of the extracted portions excluding the extracted portions where a movement distance within a predetermined time is within a predetermined distance;
a detection area-information updater configured to update the detection-area information for each measurement direction under a predetermined condition; and
an alert-signal output unit configured to output an alert signal in a case where a human body is determined to be present by the human-body determining unit, wherein
the detection area-information updater gradually updates the detection-area information of the measurement direction at a predetermined proportion in a case where a height calculated from the distance information for each measurement direction based on the installation state information is equal to or less than a predetermined height.

2. The laser scan sensor according to claim 1, wherein
the detection area-information updater is configured to update the detection-area information by replacing the detection-area information of the measurement direction with a weighted average value of the detection-area information and the distance information acquired by the distance-information acquiring unit, the distance information having a smaller weight.

3. The laser scan sensor according to claim 1, wherein
the installation state information includes at least an installation height and a measurement direction of the laser range finder.

4. The laser scan sensor according to claim 1, further comprising
a switching unit configured to switch between valid and invalid states of the detection area-information updater.

5. The laser scan sensor according to claim 1, wherein
the detection-area information is the distance information for each measurement direction immediately after operation start of the distance-information acquiring unit or after a lapse of a certain period of time after the operation start of the distance-information acquiring unit.

6. The laser scan sensor according to claim 2, wherein
the installation state information includes at least an installation height and a measurement direction of the laser range finder.

7. The laser scan sensor according to claim 2, further comprising
a switching unit configured to switch between valid and invalid states of the detection area-information updater.

8. The laser scan sensor according to claim 2, wherein
the detection-area information is the distance information for each measurement direction immediately after operation start of the distance-information acquiring unit or after a lapse of a certain period of time after the operation start of the distance-information acquiring unit.

* * * * *